United States Patent [19]
Kuwahara

[11] Patent Number: 5,804,897
[45] Date of Patent: Sep. 8, 1998

[54] PERMANENT MAGNET VEHICLE BRAKING APPARATUS

[75] Inventor: Tohru Kuwahara, Kanagawa, Japan

[73] Assignee: Isuzu Motors Ltd., Tokyo, Japan

[21] Appl. No.: 757,012

[22] Filed: Nov. 26, 1996

[30] Foreign Application Priority Data

Nov. 30, 1995 [JP] Japan ................................. 7-336180

[51] Int. Cl.⁶ .................................................. H02K 49/02
[52] U.S. Cl. ................................. 310/77; 310/86; 310/93; 310/104; 310/105; 464/29; 192/84.3; 188/267
[58] Field of Search ........................... 310/105, 77, 93, 310/86, 104; 464/29; 192/84.3; 188/267

[56] References Cited

U.S. PATENT DOCUMENTS

| | | | |
|---|---|---|---|
| 4,226,574 | 10/1980 | Villette | 417/420 |
| 5,023,499 | 6/1991 | Kuwahara | 310/105 |
| 5,054,587 | 10/1991 | Matsui et al. | 188/267 |
| 5,064,029 | 11/1991 | Araki et al. | 188/267 |
| 5,303,802 | 4/1994 | Kuwahara | 188/158 |
| 5,376,862 | 12/1994 | Stevens | 310/75 D |

FOREIGN PATENT DOCUMENTS 04-012661  1/1992  Japan ..................................... 310/105

*Primary Examiner*—Thomas M. Dougherty
*Assistant Examiner*—Karl Imayoshi E. Tamai
*Attorney, Agent, or Firm*—John E. Toupal; Harold G. Jarcho

[57] ABSTRACT

Projecting into a brake drum is an annular guide frame defining an annular inner chamber of rectangular shape in section, having an outer wall portion formed by a thin cylindrical body of nonmagnetic material, and an inner annular wall of ferromagnetic material. An annular magnet support member is axially movable within the inner chamber of the guide frame, and supports a plurality of permanent magnets disposed closely adjacent to the cylindrical body and in circumferentially spaced apart positions of uniform pitch, the polarities of the permanent magnets alternating circumferentially.

15 Claims, 4 Drawing Sheets

PERMANENT MAGNET VEHICLE BRAKING APPARATUS

BACKGROUND OF THE INVENTION

This invention relates generally to a vehicle braking system having an eddy current reduction retarder for imparting braking force to the vehicle, and more particularly, to a permanent magnet type eddy current reduction retarder apparatus of reduced weight and increased braking ability.

As disclosed in Japanese Patent Application Laid-Open No. 3(1991)-86,061 and FIG. 8 herein, a permanent magnet support cylinder is received by an annular guide frame constituting a part of a protective case. During braking, the magnet support cylinder projects into a brake drum, and the permanent magnets form magnetic circuits between the magnets and the brake drum through ferromagnetic pole pieces of the guide frame. When the rotating brake drum traverses the magnetic fields, eddy currents are generated to produce a braking force in a direction reversed to the rotational direction of the brake drum.

However, in that conventional eddy current retarder device, the magnetic flux passes through thick ferromagnetic pole pieces resulting in a reduction in the magnetic flux arriving at the brake drum and a corresponding reduction in the braking force. A further reduction in braking force is caused by the large electric conductivity of the brake drum. In addition, since the ferromagnetic pole pieces are connected to the guide frame, the overall construction is complex, manufacturing cost is high and weight is increased.

As shown in FIG. 8, during rotation of a brake drum 15, most of the generated magnetic flux is drawn therein to provide braking force. However, a portion of the magnetic flux does not enter the brake drum 15, being shunted by a ferromagnetic pole piece 51 adjacent thereto or a different pole of an adjacent magnet 8.

The object of the present invention, therefore, is to provide an improved permanent magnet type eddy current braking apparatus which exhibits reductions in cost and weight and increased braking ability.

SUMMARY OF THE INVENTION

According to certain features of the present invention, an annular guide frame defining an annular space of rectangular shape in section has one end secured to a vehicle body and an opposite end projecting into a brake drum. Movably supported within the guide frame are a plurality of permanent magnets annularly arranged in a circumferentially equally spaced relationship. An outer cylindrical portion of the guide frame facing an inner surface of the brake drum is formed from a thin plate of a nonmagnetic material, and an inner annular portion of the guide frame is formed of a ferromagnetic material. The cylindrical thin plate is formed of nonmagnetic material such as austenite based stainless steel, aluminum, heat resistant synthetic resin, strengthened fiber-contained carbon, etc. and extends around the entire periphery of the guide frame to provide a sealed construction for protecting the permanent magnets. Because of the thin plate, for example, an aluminum plate having 0.5 to 0.8 mm of thickness, foreign matter is shielded from the magnets accommodated in the guide frame. Accordingly, the magnets are protected from damage or corrosion and the guide frame is smaller in size and lighter in weight.

According to the present invention, the ferromagnetic pole pieces of the prior art are replaced by the thin nonmagnetic cylindrical body portion of the guide frame and permitting the permanent magnets to be placed close to the inner surface of the brake drum. Consequently, the magnets exert on the brake drum an intense magnetic field, a large braking force is produced, and it is possible to miniaturize the guide frame and reduce both the weight and the manufacturing cost thereof.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
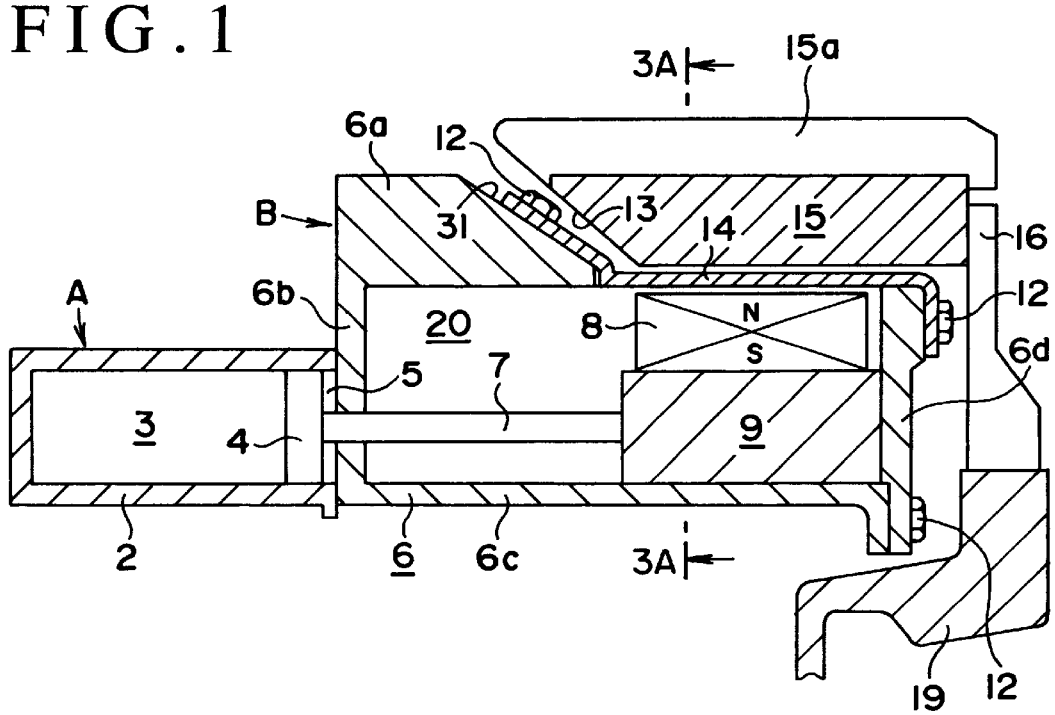
FIG. 1 is a side sectional view showing main components of a permanent magnet type eddy current retarder apparatus according to the present invention.

As shown in FIG. 1, a brake drum 15 is provided with cooling fins 15a and has a right end connected by welding or the like to a number of spokes 16. Supporting the radially extending spokes 16 is a disk-like mounting flange 19 which is connected to an output shaft of a vehicular transmission or speed change gear (not shown). A left end of the brake drum 15 is formed with a conical surface 13 so that heat within the brake drum 15 is diffused outwardly.

An annular guide frame B is secured, for example, to the wall of the speed change gear (not shown) and defines an annular inner closed chamber 20 having a rectangular shape in section. A right half of the guide frame B extends into the brake drum 15 leaving a slight clearance. More specifically, the guide frame B is composed of an annular frame body 6 in the form of a C-shape in section and formed of a ferromagnetic material such as iron, a thin cylindrical body 14 facing an inner surface of the brake drum 15 and formed of a nonmagnetic material, and an annular cover plate 6d. The frame body 6 integrally includes an end wall 6b, an outer cylindrical wall portion 6a having substantially the same wall-thickness as the brake drum 15, and an inner cylindrical wall portion 6c. Attaching the cover plate 6d to the right end of the inner wall 6c are a plurality of bolts 12. The outer cylindrical wall portion 6a is formed with a conical surface 31 facing the conical surface 13 of the brake drum 15.

According to the present invention, the cylindrical body 14 preferably is a thin plate having 0.4 to 0.8 mm of thickness and formed of a nonmagnetic material such as austenite based stainless steel, aluminum, heat resistant synthetic resin, fiber reinforced carbon material, etc.. The cylindrical body 14 faces the inner surface of the brake drum 15 and is connected between the conical surface 31 of the outer cylindrical wall portion 6a and the outer peripheral edge of the cover plate 6d by a plurality of bolts 12 in order to seal the chamber 20 of the guide frame B. Formed at the left end of the cylindrical body 14 is a conical portion mated to the conical surface 31 and formed at the right end of the body 14 is a radially inwardly projecting flange portion engaging the outer peripheral edge of the cover plate 6d.

A magnet support cylinder 9 having substantially the same wall thickness as the brake drum 15 is accommodated in the chamber 20 of the guide frame B. Forming the magnet support cylinder 9 is an annular member formed of a ferromagnetic material such as iron and is axially slidably supported by the inner cylindrical wall portion 6c. A plurality of permanent magnets 8 are fastened to the outer surface of the annular magnet support member 9 in circumferentially spaced apart positions of uniform pitch. The magnets 8 are provided with magnetic poles of circumferentially alternating polarity facing the inner surface of the brake drum 15.

A plurality (preferably three) of circumferentially distributed actuators A are connected to the cover plate 6b. Each actuator includes a piston-cylinder assembly coupled to the annular magnet support member 9. The actuators A drive the annular member 9 and supported magnets 8 between a braking position projected within the brake drum 15 (shown in FIG. 1) and a non-braking position with the magnet support member 9 withdrawn from the brake drum 15 and in contact with the end wall 6b. Each actuator A includes a cylinder 2 divided into a pair of chambers 3 and 5 by a piston 4. Connecting each piston 4 to the magnet support member is a rod 7 projecting through the end wall 6b and the annular chamber 20 of the guide frame B.

Figure 2:
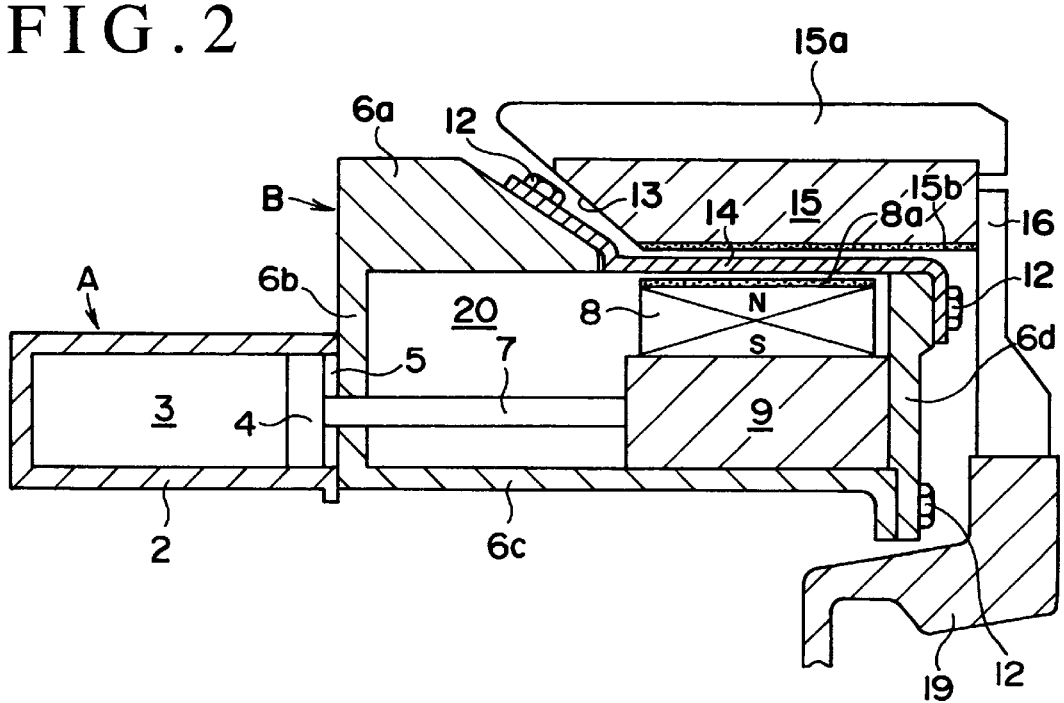
FIG. 2 is a side sectional view showing main components of a modified embodiment of the present invention.
Figure 3:
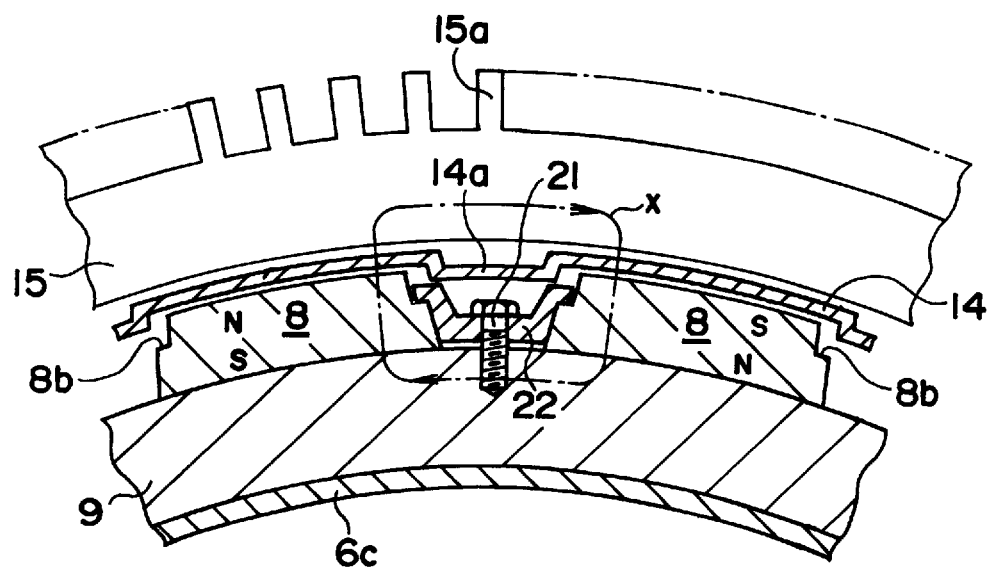
FIG. 3 is a front section view taken on line 3A—3A of FIG. 1.

As shown in FIG. 2, a thin heat insulating plate 8a preferably is connected to the outer surface of each magnet 8 in order to protect them from heat generated during braking. The brake drum 15 is formed of iron or the like but preferably is provided on its inner surface with a thin coating 15b formed of a good electrical conductor such as copper to thereby enhance braking force. As shown in FIG. 3, each magnet 8 is in the form of a block and is secured to the annular magnet support member 9 by a pair of attachment members 22 having a U-shape in section and attachment bolts 21. Each member 22 has ends placed upon shoulders 8b formed on ends of each magnet 8 and is fastened to the magnet support member 9 by a bolt 21.

Figure 4:
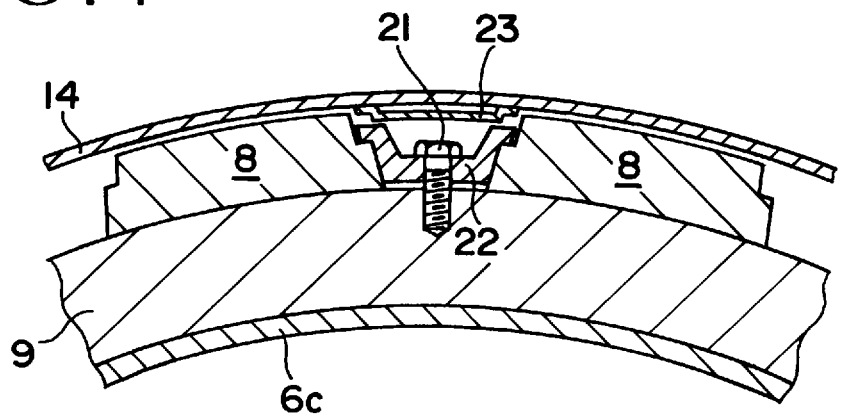
FIG. 4 is a front sectional view showing main components of another modified embodiment of the present invention.
Figure 5:
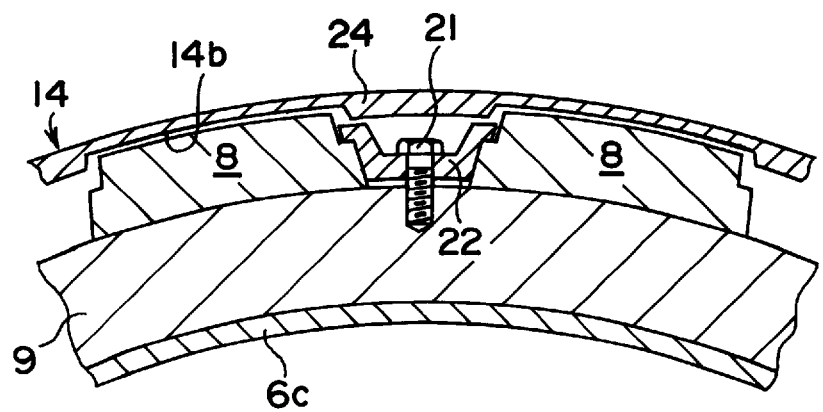
FIG. 5 is a front sectional view showing main components of another modified embodiment of the present invention.

Preferably, the cylindrical body 14 is formed with a plurality of circumferentially spaced, axially extending ribbed grooves 14a (FIG. 3). Each groove 14a projects into a space between each pair of adjacent magnets 8 and is formed by stamping or the like to enhance the rigidity and strength. As shown in the embodiment of FIG. 4, a reinforcing rib plate 23 having a U-shape in section projects into the space between each pair of adjacent magnets 8. Each plate 23 may be connected to the inner surface of the cylindrical body 14 by welding or the like and enhances rigidity and strength. In the embodiment shown in FIG. 5, wherein the cylindrical body 14 is cast or molded of resin, axial grooves 14b are formed to provide axially extending ribs 24 on the inner surface of the cylindrical body 14. Each rib 24 projects into a space between an adjacent pair of magnets 8 and provides rigidity and strength.

The operation of the present invention now will be described. When braking, the magnet support member 9 is pushed by the actuators A into positions at which the magnets 8 are adjacent to the inner surface of the brake drum 15 (FIG. 1). In those positions, the magnets 8 exert on the brake drum 15 a magnetic field via the thin cylindrical body 14 to form a magnetic circuit x (FIG. 3) between the brake drum 15 and the magnet support member 9. As the rotating brake drum 15 traverses the magnetic field, eddy current flow in the brake drum 15 generates a braking torque.

When braking is to terminate, hydraulic pressure fluid is supplied to the chambers 5 of the actuators A, and fluid is discharged from the chamber 3. As a result thereof, the magnet support member 9 is pulled leftward by the piston 4 until it contacts the end wall 6b. The magnets 8 correspondingly are withdrawn from the interior of the brake drum 15 to produce a magnetic circuit between the outer end wall portion 6a of the guide frame B and the magnet support member 9, and magnetic field is removed from the brake drum 15.

According to the present invention, the cylindrical body 14 replaces the ferromagnetic pole pieces employed by the prior art for protecting the magnets 8. Therefore, the magnets 8 can be positioned more closely to the inner surface of the brake drum 15 resulting in application of a more intense magnetic field on the brake drum 15 and a stronger braking force. In other words, even if the radius of the brake drum 15 is reduced by a thickness of conventional ferromagnetic pole pieces, sufficient braking force is produced. Thus, the eddy current reduction apparatus of the invention can be used on a small vehicle.

Figure 6:
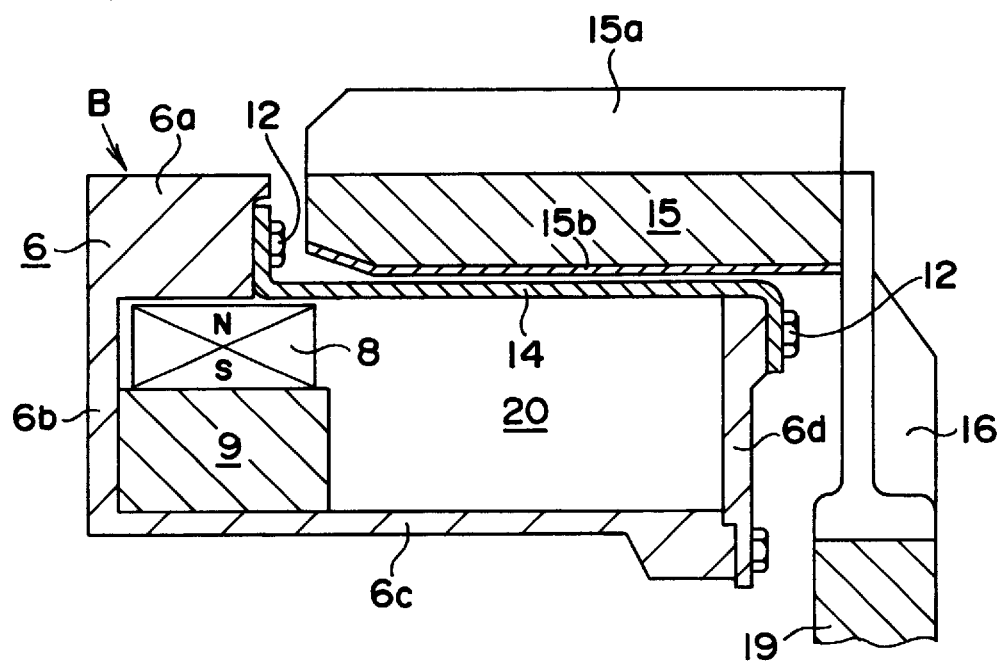
FIG. 6 is a side sectional view showing main components of another modified embodiment of the present invention.

As shown in the embodiment of FIG. 6, even if the axial dimensions of the magnet support member 9 and the magnets 8 are considerably shortened relative to the brake drum 15 having the conventional dimensions, a braking force equal to that of the prior art can be obtained. Thus, excess space can be provided in the inner portion of the chamber in the guide frame B, and cooling performance relative to heat generated during braking is enhanced. Further, in order to relieve a rise in temperature within the frame body 6, a blower can be provided in a region not readily accessible to water or dust (for example, the inner cylindrical portion 6c of the frame body) to thereby prevent a rise in internal pressure.

Figure 7:
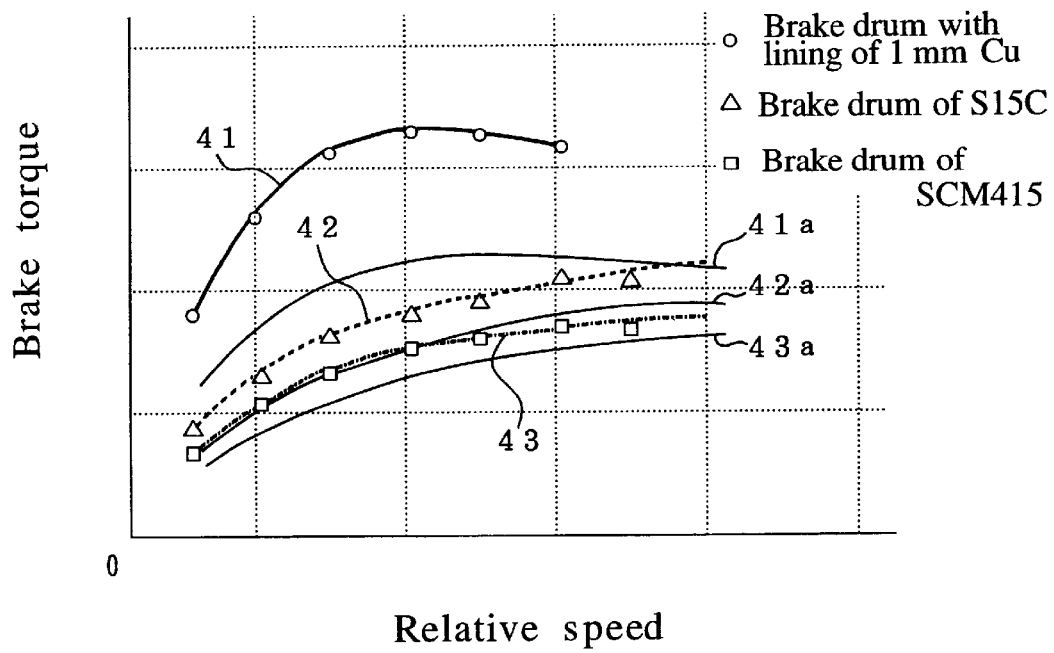
FIG. 7 is a diagram representative of braking characteristics of a permanent magnet type eddy current retarder apparatus according to the present invention and the prior art.
Figure 8:
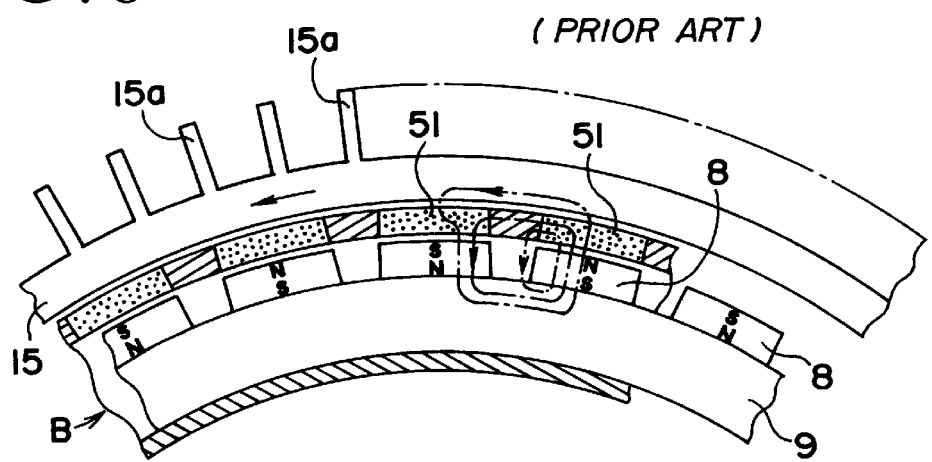
FIG. 8 is a front sectional view showing main components of a conventional permanent magnet type eddy current retarder apparatus.

Curves 41 to 43 in FIG. 7 indicate the results of braking tests of braking apparatus provided with the guide frame B according to the present invention and with brake drums 15 of different materials but having the same dimensions. Curves 41a to 43a indicate the results of braking tests of braking apparatus provided with the same brake drums 15 but with a guide frame having conventional ferromagnetic pole pieces. Curves 41, 41a, curves 42, 42a and curves 43, 43a represent, respectively, the relationship between the relative speed of the magnets 8 and the brake drum 15 and the braking torques generated, with respect to the inner surface of a brake drum provided with a copper coating having 1 mm of thickness, a brake drum of S15C, and a brake drum of SCM415.

For the braking tests depicted by curves 41–43 of FIG. 7, it will be understood that the ferromagnetic pole pieces of the prior art are replaced by the thin nonmagnetic cylindrical body 14 disposed on the guide frame B and facing to the brake drum 15. Also, the inner surface of the brake drum 15 is provided with the coating 15b formed of a good electrical conductor whereby the braking force is considerably enhanced. With the magnetic circuit of reduced length formed by the magnets 8 between the outer surface of the magnet support member 9 and the inner surface of the brake drum 15, the coating 15*b* assists flow of eddy currents, and results in generation of a large braking force.

Obviously, many modifications and variations of the present invention are possible in light of the above teachings. It is to be understood, therefore, that the invention can be practiced otherwise than as specifically described.

What is claimed is:

1. Vehicle braking apparatus comprising:

a brake drum 15 connected to a rotational shaft;

an annular member 9 formed of a ferromagnetic material;

a guide frame B for supporting said annular member in a position within and spaced from an inner surface of said brake drum;

a cylindrical body 14 formed entirely from a nonmagnetic material and defining an uninterrupted wall between said inner surface of said brake drum and said annular member;

a plurality of annularly arranged permanent magnets 8 circumferentially spaced apart in positions of uniform pitch, the polarities of said permanent magnets facing said inner surface of said brake drum alternating circumferentially;

a thin layer of heat insulating material disposed on an outer surface of each of said permanent magnets; and an actuator 4 means for producing axial movement of said annularly arranged permanent magnets into active positions within said brake drum and between said inner surface of said brake drum and said annular member, and inactive positions out of said brake drum.

2. An apparatus according to claim 1 wherein said guide frame defines a closed annular chamber retaining said permanent magnets and partially formed by said cylindrical body, said guide frame having one end secured to a vehicle body and an opposite end projecting into said brake drum.

3. An apparatus according to claim 2 wherein said guide frame has an outer wall formed by said cylindrical body and facing said inner surface of said brake drum, and an inner wall supporting said annular member.

4. An apparatus according to claim 3 wherein said cylindrical body is a thin plate of nonmagnetic material having a thickness of 0.4 to 0.8 mm.

5. An apparatus according to claim 4 wherein said permanent magnets are supported by said annular member and movable therewith as a unit by said actuator.

6. An apparatus according to claim 5 including attachment members, each secured between said annular member and adjacent ends of a different pair of said permanent magnets.

7. An apparatus according to claim 1 including a thin layer of electrically conductive material disposed on said inner brake drum surface.

8. An apparatus according to claim 7 wherein said guide frame defines a closed annular chamber retaining said permanent magnets and partially formed by said cylindrical body, said guide frame having one end secured to a vehicle body and an opposite end projecting into said brake drum.

9. An apparatus according to claim 8 wherein said guide frame has an outer wall formed by said cylindrical body and facing said inner surface of said brake drum, and an inner wall supporting said annular member.

10. An apparatus according to claim 9 wherein said cylindrical body is a thin plate of a nonmagnetic material having a thickness of 0.4 to 0.8 mm.

11. An apparatus according to claim 10 wherein said permanent magnets are supported by said annular member and movable therewith as a unit by said actuator.

12. An apparatus according to claim 11 including attachment members, each secured between said annular member and adjacent ends of a different pair of said permanent magnets.

13. An apparatus according to claim 5 wherein said actuator means comprises hydraulic actuator means coupled to said annular member.

14. An apparatus according to claim 13 wherein said hydraulic actuator means comprises a plurality of circumferentially distributed piston and cylinder assemblies each having a piston connected to said annular member.

15. An apparatus according to claim 1 wherein said cylindrical body includes circumferentially spaced apart, axially extending rib portions providing rigidity and strength.

* * * * *